S. C. CASE & O. N. DYBVIG.
HAY PRESS.
APPLICATION FILED MAY 3, 1915.

1,201,695.

Patented Oct. 17, 1916.

Witnesses
W. K. Ford
Phyllis Coburn

Inventors
Sidney C. Case &
Olaf N. Dybvig.

By Whittemore Hulbert & Whittemore
Attorneys

UNITED STATES PATENT OFFICE.

SIDNEY C. CASE AND OLAF N. DYBVIG, OF ANN ARBOR, MICHIGAN, ASSIGNORS TO ANN ARBOR MACHINE COMPANY, OF ANN ARBOR, MICHIGAN, A CORPORATION OF MICHIGAN.

HAY-PRESS.

1,201,695.  Specification of Letters Patent.  Patented Oct. 17, 1916.

Application filed May 3, 1915.  Serial No. 25,507.

*To all whom it may concern:*

Be it known that we, SIDNEY C. CASE and OLAF N. DYBVIG, citizens of the United States of America, residing at Ann Arbor, in the county of Washtenaw and State of Michigan, have invented certain new and useful Improvements in Hay-Presses, of which the following is a specification, reference being had therein to the accompanying drawings.

The invention relates to hay presses of that type in which the compression plunger is reciprocated in the box or receptacle by a pitman actuated by a rotating crank, the material to be compressed being fed into the box by a transversely-reciprocating feeder. With such constructions it is desirable to prevent the falling of the hay or other material to be compressed behind the plunger when the latter is in forward or compression position. To this end an apron is attached to the plunger and projects rearward therefrom so as to close the feed opening while the piston is forward, but on account of the length of the stroke in relation to the length of the pitman, an apron which would fully close the feed opening in forward position would interfere with the crank in its rear position. To avoid this difficulty we have provided an extensible apron, which as the plunger is pressed forward will elongate to completely cover the opening, and as the plunger is withdrawn will be contracted to avoid interference with the crank.

Figure 1:
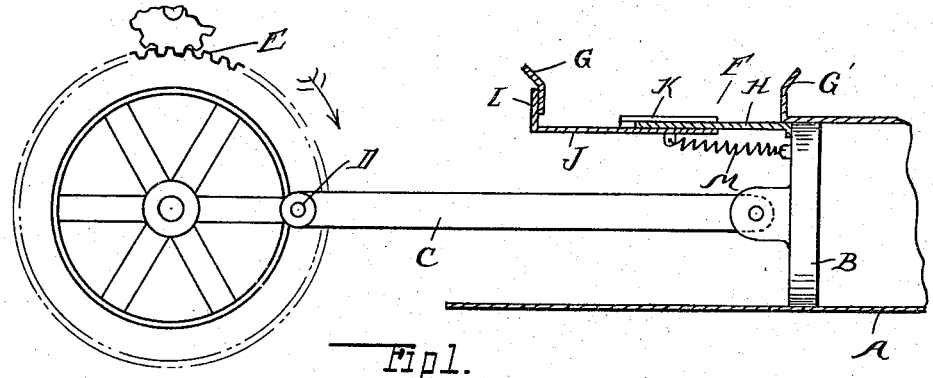
Figure 2:
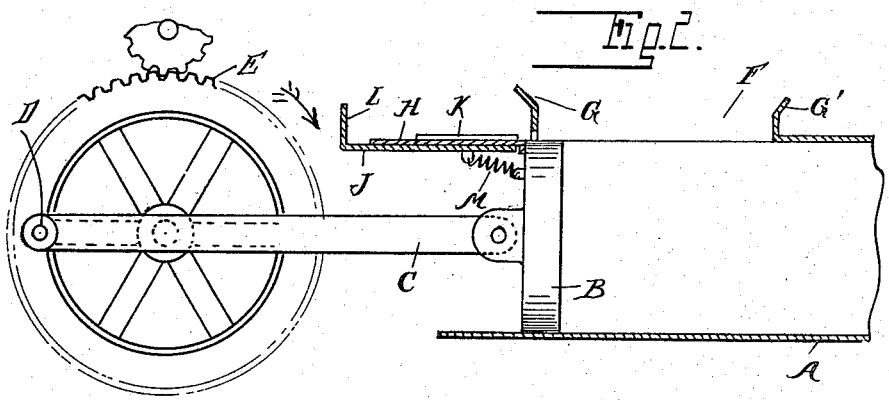
Figure 3:
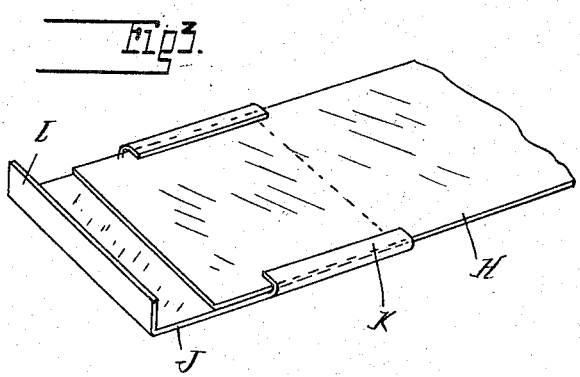

In the drawings: Figure 1 is a longitudinal section through a hay press to which our improvements are applied, showing the plunger in forward position; Fig. 2 is a similar view showing the rearward position of the plunger; and Fig. 3 is a perspective view of the extensible apron.

A is the box or compression receptacle, B the reciprocating plunger, C the pitman rod connection and D the revolving crank for said pitman having the peripheral gear teeth E for engagement with the driving pinion.

F is the feed opening in the top of the compression box, preferably having flaring flanges G and G' at opposite ends thereof.

The plunger B is provided with a rearwardly-extending apron H which is of a length limited to that which will clear the crank and gear teeth E in the retracted position of the plunger. This length is insufficient to completely cover the opening F when the plunger is forward, and we have therefore provided an extension J which is telescopically attached to the apron H, preferably by return-bent flanges K upon opposite sides thereof. The rear end of the extension J has a flange L, which in the forward movement of the plunger abuts against the flange G and limits the forward movement. Thus during the forward movement of the plunger the extension J will travel with the apron H until the flange L strikes the flange G, after which said extension will remain stationary while the apron F continues to move. During the rear stroke of the plunger the apron F will travel forward for a short distance without imparting movement to the extension J, and this will contract the length so as to avoid interference with the gear teeth E of the revolving crank. If through any reason this contraction fails to take place and the extension J travels from the start with the apron H, the inclined flange L is at such an angle as to avoid catching on the gear teeth. Thus the contact of said teeth will merely force it forward to compel contraction. However, to normally cause contraction a spring M is preferably arranged between the extension J and the plunger, as shown in Fig. 1.

What we claim as our invention is:—

1. In a hay press, the combination with the compression box or receptacle having a feed opening therein, of a reciprocatory plunger, a pitman for actuating said plunger, a crank for actuating said pitman provided with peripheral gear teeth, an apron extending rearward from said plunger, a telescopic extension of said apron having an end flange, said apron and extension together closing said feed opening in the forward position of the plunger and said flange being adapted to guard said apron from interference with said gear teeth upon the rearward movement of the plunger.

2. In a hay press, the combination with the compression box or receptacle having a feed opening therein, of a reciprocatory plunger, means for actuating said plunger, an apron extending rearwardly from said plunger, a telescopic extension of said apron, a spring for contracting said telescopic extension upon said apron during the rearward movement of said plunger, and a stop for arresting said telescopic extension and extending the same upon said apron in the forward movement of said plunger to close said feed opening.

3. In a hay press, the combination with a compression box or receptacle having a feed opening therein, of a reciprocatory plunger, means for actuating said plunger, an extensible closure for said feed opening carried by the plunger, means associated with said closure positively acting to contract the same upon the rearward stroke of the plunger and a stop for engaging and extending said closure during forward movement of said plunger.

In testimony whereof we affix our signatures in presence of two witnesses.

SIDNEY C. CASE.
OLAF N. DYBVIG.

Witnesses:
T. S. LANGFORD,
S. W. CLARKSON.

Copies of this patent may be obtained for five cents each, by addressing the "Commissioner of Patents, Washington, D. C."